Oct. 1, 1963  H. FUNKE ET AL  3,105,390
MEANS FOR FASTENING THE REINFORCEMENT OF BELTS
Filed March 30, 1961  4 Sheets-Sheet 1

INVENTORS
H. Funke and H.-H. Wiese
BY
Richards & Geier
ATTORNEYS

INVENTORS
H. Funke and H.-H. Wiese

BY
Richards & Geier
ATTORNEYS

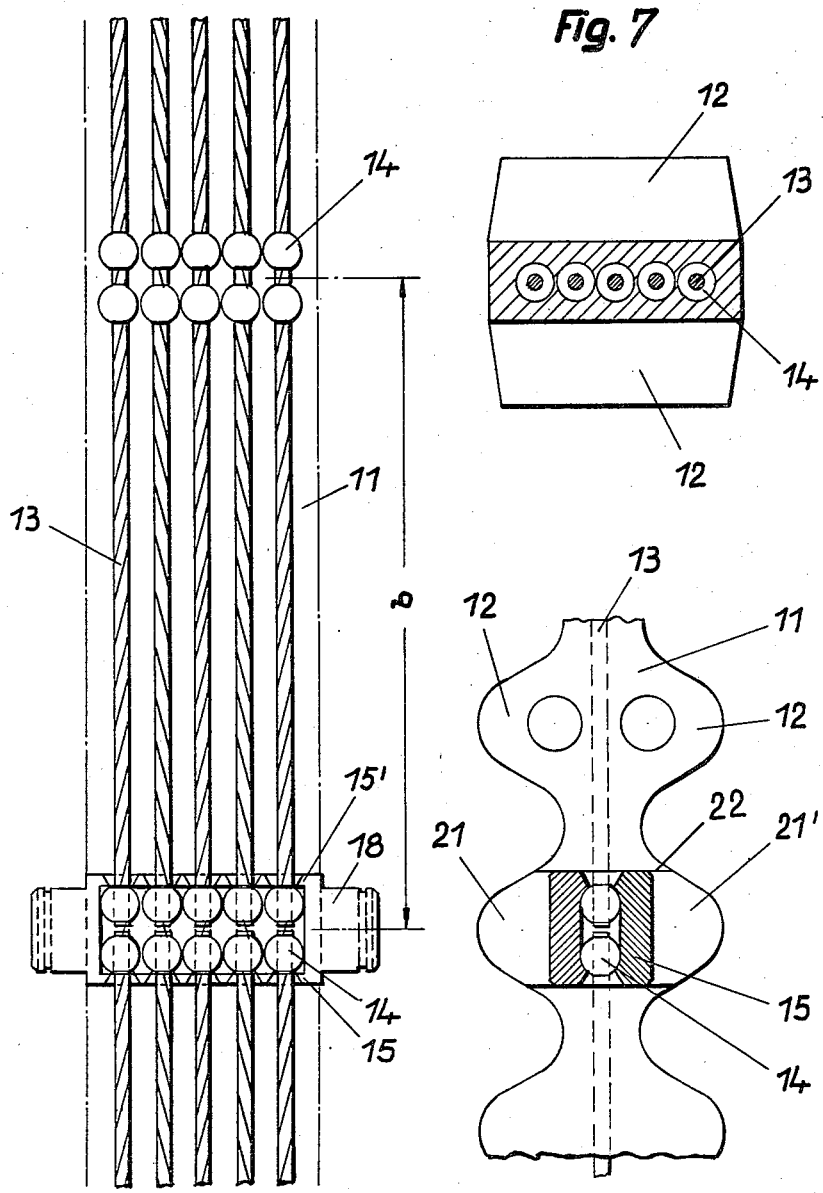

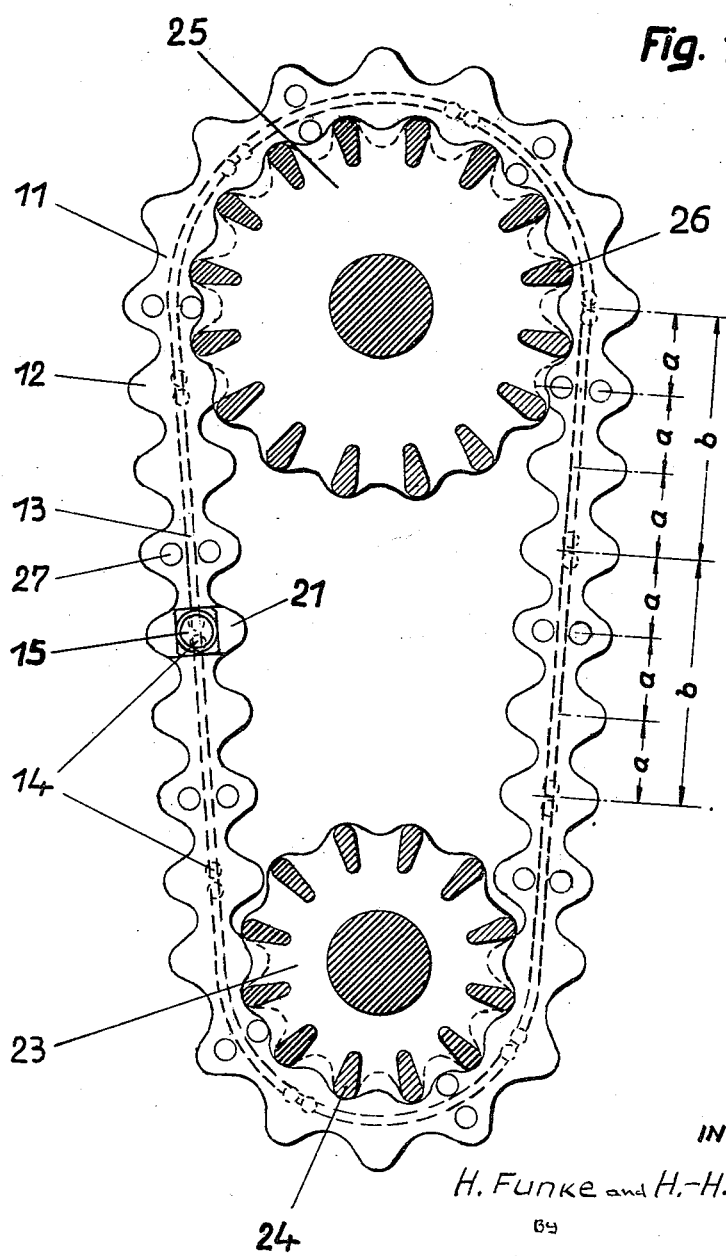

United States Patent Office 3,105,390
Patented Oct. 1, 1963

3,105,390
MEANS FOR FASTENING THE REINFORCEMENT OF BELTS
Helmut Funke, Im Moore 34, and Hans-Holger Wiese, Schmiedestrasse 24, both of Hannover, Germany
Filed Mar. 30, 1961, Ser. No. 99,428
Claims priority, application Germany Mar. 30, 1960
6 Claims. (Cl. 74—237)

The present invention refers to belts, particularly conveyer belts of rubber or similar material, with a reinforcement, such reinforcement consisting, as a rule, of wire cables or steel wires.

It is an object of the present invention to shape the joint between the ends of the reinforcing cables or wires in such a way that the flexibility of the belt at the joint is not impaired in any way so that the belt may be made to run on propelling gears or deviating rollers of small diameters.

It is another object of the invention to provide for a simple method of modifying the length of endless belts equipped with block teeth, without modifying the tooth pitch of said belts.

It is still a further object of the invention to provide for the imbedding of the joining means for the reinforcement into the material of the belt in such a way that the lock as well as the end of the reinforcement are completely protected against exterior influences thus allowing the belt to be made to pass liquids and the like.

Further details of the invention will result from the drawings showing several embodiments of the object of the invention.

Figure 1:
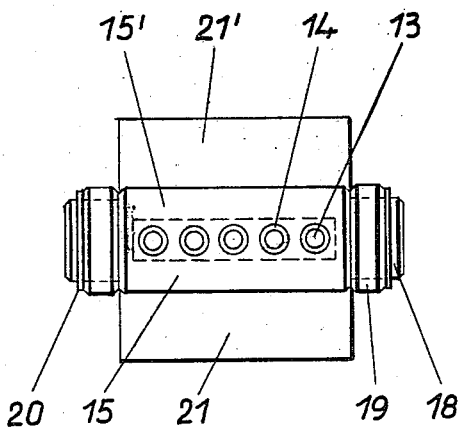
Figure 2:
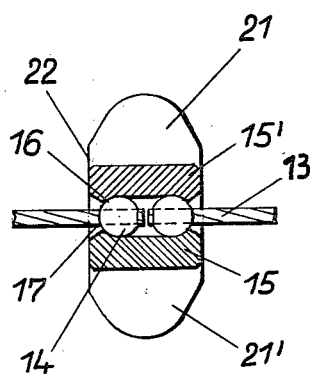

In these drawings:

FIG. 1 represents the front view,

FIG. 2 the cross section and

Figure 3:
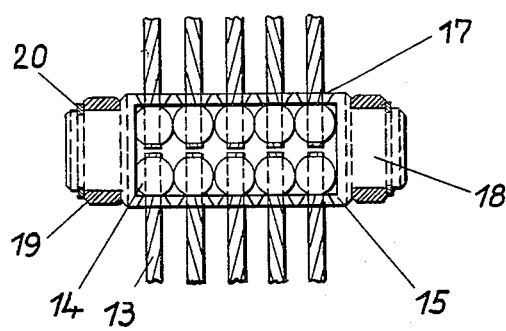
Figure 4:
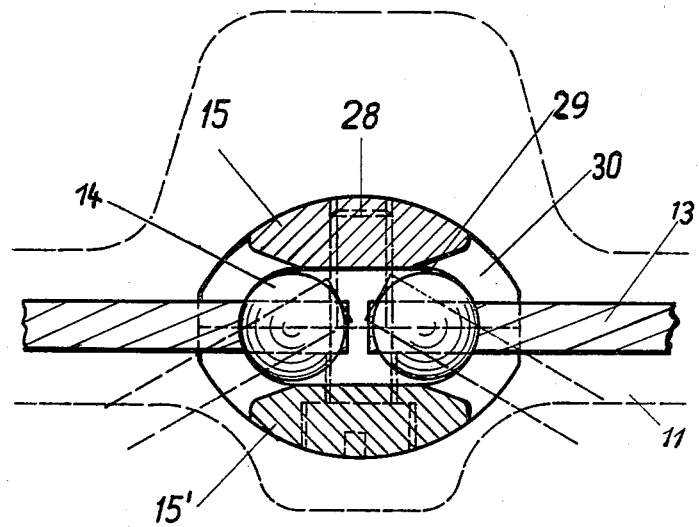
Figure 5:
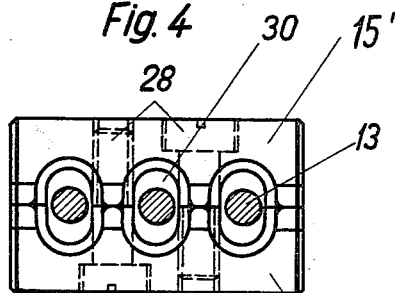
Figure 6:
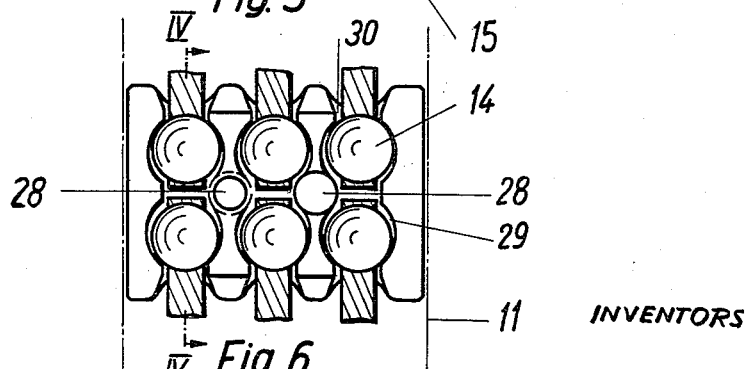

FIG. 3 the longitudinal section of a lock according to the invention,

FIG. 4 represents the cross section of another embodiment of the lock in the optical flat IV—IV of FIG. 6, FIG. 5 is the front view and FIG. 6 the longitudinal section of FIG. 4, FIG. 7 represents the cross section and FIG. 8 the longitudinal section of a belt equipped with teeth on either side, FIG. 9 represents the longitudinal section and FIG. 10 the side view of an endless toothed driving belt in simplified representation.

The lock shown in FIGURES 1 and 3 is imbedded into the material of the belt 11 which, as in FIG. 10, consists of an elastic substance such as rubber, synthetic material or the like and, on either side, is equipped with teeth. In the embodiment shown in FIG. 10, these teeth are arranged in reciprocal symmetry. However, they may as well be staggered, e.g. to fill the reciprocal gaps. In the neutral zone of the belt 11, a strainproof reinforcement is imbedded consisting of several, e.g. five, steel cables 13 placed side by side.

Steel balls 14 are fixed on each of the steel cables 13, said steel balls being bored and the steel cables being carried through the bore so that the balls are pressed on to the cables in such a way that the cable strands and the balls are in metallic contact with each other and firmly united by mechanical means. When the steel balls 14 have been pressed on to the cables 13 the latter are imbedded into the yielding substance of the belt 11 so that, as shown in FIG. 9, the steel balls are then disposed in closely arranged pairs forming double cross rows, said double cross rows being distributed evenly over the length of the belt.

At the joint abutment of the belt 11, the ends of the cables 13 provided with the steel balls 14 are stripped of the substance of the belt, thus sticking out of the ends of same.

Said ends of the cables are joined by the lock represented in FIGURES 1 to 3. Said lock consists of two shells 15, 15' forming a common seat for all balls 14, said balls 14 being lodged close beside each other, thus fixing the position of the cables 13. As shown in FIG. 9, both shells 15, 15' have the same width as the belt 11. The borders of the shells 15, 15' lying athwart the belt 11, are provided, in their interior, with a spherical shoulder 16 limiting the common seat of the several balls and provided with a clearance 17 for the cable 13, said clearance opening out conically in outward direction. Said spherical shoulder 16 in both shells 15, 15' provides, for the steel balls 14, a seat similar to that provided by the socket of a ball-and-socket joint whereas, owing to the clearances 17 opening out conically in outward direction, the ends of the cables 13 are allowed to freely follow the direction of the belt as required, without being kinked in any way whatsoever. On the contrary, the flexibility of said belt will practically be the same at every point of its length so that there will be no difficulty in having it run over driving gears or deviating rollers of small diameters. In addition to this, the joint is highly resistant to strain as the bore of the steel balls 14 is firmly pressed into the strands of the cables 13 thus preserving a close metallic contact between the balls 14 and the cables 13.

The lateral borders of the shells 15, 15' protruding beyond the belt 11, are provided with semicylindrical ears 18. When fitted together, the two shells 15, 15' are united by a metal or steel ring 19 passed over the ears 18, said ring 19 being fastened by a snap ring 20. Thus it is easy to join the ends of the cables 13 by imbedding the steel balls fixed to these ends into the locking shells 15, 15' and joining these shells by means of the two steel rings 19 and the snap rings 20. By just removing the snap rings 20 and the steel rings 19, the ends may be easily disengaged.

This joint for the cable ends may be used for smooth belts, such as e.g. conveyer belts, as well as for toothed belts equipped with teeth 12 on either side as in the embodiment represented. In this case, the cross rows of the steel balls 14 are arranged, in symmetric relation to the central plane of and inside a double tooth 12. So as not to interrupt the tooth pitch at the joint abutment of the toothed driving belt, tooth blocks 21, 21' are, in this case, vulcanized to the shells 15, 15' in the way of the well-known metal rubber, as shown in FIGURES 1, 2 and 8. The faces 22 of the tooth blocks 21, 21' are then joined to the ends of the belt 11, e.g. by vulcanization, cementing or the like so that the joint is entirely imbedded into the material of the belt and invisible from the outside. The joint does not impair the flexibility of the belt 11 in any way whatever and is highly resistant to strain.

In the case of the lock shown in FIGURES 4 to 6, the two shells 15, 15' are held together by bolts 28 and are of the same width as the belt. As shown in FIG. 5, it will be found convenient to dispose the bolts 28 in staggered relation to each other so that, even with narrow belts armored with only three cables, enough room will be left for the heads of the bolts 28. This embodiment of the lock provides for a separate seat 29, in both shells 15, 15', for each ball 14 thus keeping the three cables 13 spaced as required. Each ball seat 29 is provided with a clearance 30 for the cable 13, said clearance opening out conically in outward direction. As shown by the broken lines drawn in FIG. 4, this will allow the ends of the cable to swing, in case of a flexure of the belt, without touching the shells 15, 15' so that the belt 11 may, in this case, too, be made to run over driving gears or deviating rollers of small diameters.

In the case of toothed belts, it will be found convenient to space the centre lines of the double rows of steel balls 14 evenly distributed over the length of the belt and imbedded into the substance, in accordance with the tooth pitch as shown in the embodiment of an endless toothed belt represented in FIG. 10. This toothed belt 11 is equipped, on either side, with teeth 12 and shows a tooth pitch $a$ whereas the centre lines between the cross rows of the steel balls 14 show a mutual distance of the length $b$ corresponding to a multiple, e.g. a triple, of the tooth pitch $a$. When severing the belt and inserting a new belt element of the length $b$ or a multiple of same this will cause the elongated belt to have the same tooth pitch $a$. In order to lengthen the belt, it is thus convenient to cut it between the two rows of the steel balls 14 in the central plane of a double tooth 12.

The joint abutments of the belt element to be inserted, of a length $b$ or a multiple of same, are then joined by means of the lock as shown in FIGURES 1 to 3 or FIGURES 4 to 6. In the same way, the belt may be shortened at will by cutting one or several of the belt elements between the double rows of steel balls 14, the tooth pitch remaining unchanged, in this case, too.

Such a division of the length of the belt into individual belt elements after the principle of the assembly of prefabricated parts, will also allow of a simple exchange of defective or worn belt parts. Apart from this, a belt broken for some reason or other, may be repaired in very little time by cutting out the torn belt element and replacing it by a new one, an operation which, in this case will not lead to any prolonged shutdown. On top of this, the belt will keep its original flexibility, even in case of several joints, so that there will be no difficulty in having it run over driving gears or deviating rollers of small diameters.

In the case of the simplified embodiment shown in FIG. 10, the belt 11 equipped, on either side, with teeth 12, serves as a lateral connection belt of a bar grate conveyer belt running over the toothed wheels 23 and 25 wheel 23 of which is a driving gear engaging, with its teeth 24, the gaps between the inner teeth 12. The second wheel 25, in this case, is a guiding roller the teeth 26 of which also engages the gaps between the teeth 12. However, the arrangement may be reversed, the larger wheel 26 serving as a driving gear and the smaller wheel 23 as a guiding or deviating wheel. The grate bars are introduced, in symmetrical relation to the cable armor 13, into clearances 27 of the individual double teeth 12 or of all of these.

Owing to the excellent flexibility and the high resistance to strain—a result of the form of the joint according to the present invention—this belt may also be deviated repeatedly or reversed overhead, e.g. in case of the drag lines of a bucket elevator, etc. In such cases, it is often necessary to lengthen or shorten the belt, e.g. when changing the belt track or the charging or delivery points. In the case of belts according to the principle of the present invention, this will cause no difficulties whatever and never impair the flexibility or the resistance to strain of the belt. Apart from this, the ball-and-socket principle of the cable joint will permit the operator to change the conveying direction at will while loading the belt at either side with the goods to be transported as, owing to the ball-and-socket principle of the joint lock as well as to the spherical opening of the entrance for the cable ends, the belt will preserve equal flexibility in both cross directions.

The invention may be applied to smooth as well as to toothed belts of every kind, but particularly to all cases calling for an easy uncoupling at the joint on top of an excellent flexibility and a great resistance to strain.

Various embodiments of the invention may be employed within the scope of the accompanying claims.

We claim:

1. In combination with a toothed belt, a belt reinforcement comprising a plurality of stranded wire cables extending in the longitudinal direction of the belt and imbedded therein, said cables having abutting ends, metal balls fixed upon said cable ends, other metal balls fixed upon lengths of the cables, all said balls being located in pairs of rows longitudinally distributed uniformly throughout the length of the belt, the balls of each row being located closely one to the other and the balls of one row of one pair facing the balls of the other row of the same pair, the balls being imbedded in said belt along with said cables, said cables having free ends projecting out of the first-mentioned balls, and a lock carried by said belt and enclosing the first-mentioned balls.

2. A belt reinforcement in accordance with claim 1, wherein the distance between said pairs of rows is a multiple of the tooth pitch of said toothed belt.

3. A belt reinforcement in accordance with claim 1, wherein said lock is imbedded in said belt.

4. A belt reinforcement in accordance with claim 3, comprising a tooth block firmly mounted upon said lock and having the same shape as the teeth of said toothed belt, said tooth block being connected with the ends of said belt.

5. A process of varying lengths of endless belts having a plurality of stranded wire cables extending in the longitudinal direction of the belt and imbedded therein, and metal balls carried by said cables and located in pairs of rows distributed uniformly throughout the length of the belt, the balls of each row being located closely one to the other and the balls of one row of one pair facing the balls of the other row of the same pair, said process comprising the steps of cutting off a length of belt extending from the middle of a pair of rows of balls to the middle of an adjacent pair of rows of balls, replacing the cut-off length of belt by a similarly constructed length of belt and then locking each row of balls upon the new length of belt with an adjacent row of balls upon the remaining length of belt.

6. A process of varying lengths of endless belts having plurality of stranded wire cables extending in the longitudinal direction of the belt and imbedded therein, and metal balls carried by said cables and located in pairs of rows distributed uniformly throughout the length of the belt, the balls of each row being located closely one to the other and the balls of one row of one pair facing the balls of the other row of the same pair, said process comprising the steps of cutting off a length of belt extending from the middle of a pair of rows of balls to the middle of an adjacent pair of rows of balls, and then interlocking the two rows of balls located upon the edges formed by the cutting.

References Cited in the file of this patent

UNITED STATES PATENTS

| 1,706,354 | Geist | Mar. 19, 1929 |
| 2,438,548 | Ehmann | Mar. 30, 1948 |
| 2,644,992 | McFarland | July 14, 1953 |

FOREIGN PATENTS

| 696,869 | France | Oct. 20, 1930 |
| 1,162,153 | France | Apr. 8, 1958 |
| 703,751 | Great Britain | Feb. 10, 1954 |